United States Patent
Genssen

(10) Patent No.: US 8,893,758 B2
(45) Date of Patent: Nov. 25, 2014

(54) PRESSURE APPLICATION ROLLER UNIT FOR THE LAYING DOWN OF PRE-IMPREGNATED FIBRE STRIPS ON A SURFACE, AND ALSO A LAYING DOWN DEVICE

(75) Inventor: Marcel Genssen, Plauen (DE)

(73) Assignee: Airbus Operations GmbH, Hamburg (DE)

( * ) Notice: Subject to any disclaimer, the term of this patent is extended or adjusted under 35 U.S.C. 154(b) by 82 days.

(21) Appl. No.: 13/638,998

(22) PCT Filed: Apr. 1, 2011

(86) PCT No.: PCT/EP2011/001664
§ 371 (c)(1),
(2), (4) Date: Nov. 14, 2012

(87) PCT Pub. No.: WO2011/120718
PCT Pub. Date: Oct. 6, 2011

(65) Prior Publication Data
US 2013/0092325 A1    Apr. 18, 2013

Related U.S. Application Data

(60) Provisional application No. 61/320,347, filed on Apr. 2, 2010.

(30) Foreign Application Priority Data

Apr. 2, 2010 (DE) .......................... 10 2010 013 711

(51) Int. Cl.
B29C 70/38     (2006.01)
F16C 13/02     (2006.01)
B32B 37/10     (2006.01)

(52) U.S. Cl.
CPC .............. *B32B 37/10* (2013.01); *F16C 13/024* (2013.01); *B29C 70/388* (2013.01)
USPC ............ 156/433; 156/441; 156/523; 156/574

(58) Field of Classification Search
USPC .......................... 156/574, 523, 433, 441, 166
See application file for complete search history.

(56) References Cited

U.S. PATENT DOCUMENTS

| | | | |
|---|---|---|---|
| 4,292,108 A | | 9/1981 | Weiss et al. |
| 4,750,965 A | * | 6/1988 | Pippel et al. ................... 156/523 |
| 4,954,204 A | * | 9/1990 | Grimshaw ..................... 156/574 |
| 5,011,563 A | * | 4/1991 | Shinno et al. ................. 156/574 |
| 5,058,497 A | * | 10/1991 | Bishop et al. ................. 156/582 |
| 5,454,897 A | * | 10/1995 | Vaniglia ........................ 156/574 |
| 5,562,788 A | | 10/1996 | Kitson et al. |
| 2007/0044922 A1 | * | 3/2007 | Mischler et al. .............. 156/574 |
| 2008/0000576 A1 | | 1/2008 | Miller et al. |

FOREIGN PATENT DOCUMENTS

FR         2 539 122        7/1984

OTHER PUBLICATIONS

International Search Report for PCT/EP2011/001664, mailed Aug. 23, 2011.
Written Opinion of the International Searching Authority for PCT/EP2011/001664, mailed Aug. 23, 2011.
International Preliminary Report on Patentability in PCT/EP2011/001664 mailed Oct. 11, 2012 and English translation.

* cited by examiner

*Primary Examiner* — Jeff Aftergut
(74) *Attorney, Agent, or Firm* — Greer, Burns & Crain Ltd.

(57) ABSTRACT

The invention concerns a pressure application roller unit 2 for the laying down of fiber strips 80 on a surface 82, with a pressure application roller 7 mounted in a mounting unit 35 such that it can rotate about a shaft 10.
In accordance with the invention the pressure application roller 7 is subdivided into a multiplicity of roller segments 4, 6 arranged next to one another, which in each case are mounted in the mounting unit 35 such that they can be displaced.

Figure 1:
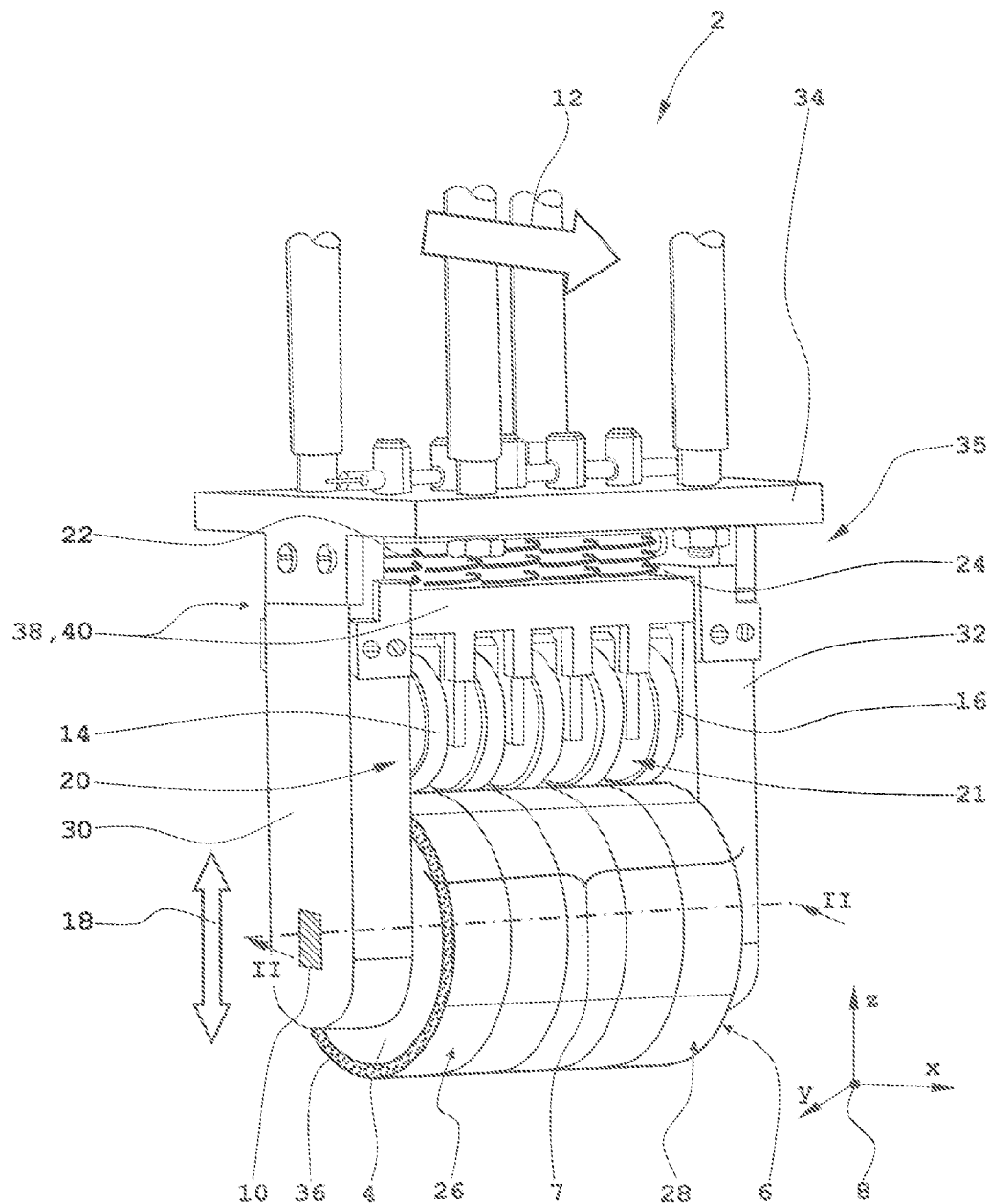

As a consequence of this configuration an optimal adaptability of the pressure application roller unit 2 to a surface 82 of a molding tool 84 that is curved in one or two dimensions is provided. By this means the pressure application roller unit 2 can be guided by means of a robot arm 102, even over molding tool surfaces that are more highly spherically curved in some sections. The individual mounting of the individual roller segments 4, 6, embodied such that they can be displaced vertically in a sprung manner, allows a height compensation of up to 10 mm, which enables any immediate track correction of the robot arm 102 that would otherwise be necessary to be dispensed with. In addition the pressure application roller unit 2 generates a defined pressure application force with which the fiber strip 80 is pressed onto the surface 82 of the molding tool 84. The pressure application roller unit 2 is equally suitable for the processing of pre-impregnated fiber strips (so-called pre-preg strips) with a thermoplastic or a thermosetting plastic matrix, since a resistance to temperatures of up to 450° C. is provided.

8 Claims, 3 Drawing Sheets

PRESSURE APPLICATION ROLLER UNIT FOR THE LAYING DOWN OF PRE-IMPREGNATED FIBRE STRIPS ON A SURFACE, AND ALSO A LAYING DOWN DEVICE

This application is the U.S. national phase of International Application No. PCT/EP2011/001664, filed 1 Apr. 2011, which designated the U.S. and claims priority to DE Application No. 10 2010 013 711.1, filed 2 Apr. 2010, and claims the benefit to U.S. Provisional Application No. 61/320,347, filed 2 Apr. 2010, the entire contents of each of which are hereby incorporated by reference.

The invention concerns a pressure application roller unit for the laying down of fibre strips on a surface, with a pressure application roller mounted in a mounting unit such that it can rotate about a shaft.

In addition the invention concerns a laying down device for the laying down of fibre strips on a surface.

In lightweight construction, in particular in aircraft construction and in space flight, fibre-reinforced composite components are deployed to an increasing extent for a very wide variety of structural components; by virtue of their high strength together with low mass these have a high weight-saving potential.

At the same time the alignment of the reinforcement fibres in the composite component has an important influence on the mechanical properties, such as, for example, stiffness and load-bearing capacity. In the ideal case the reinforcement fibres should follow the prevailing loading direction of the component, should have no waviness, and as far as possible should be subjected to even mechanical loadings.

One option for implementing the above requirements profile is provided by the so-called TFP method ("tailored fibre placement"). Here fibre strips with a width of between 5 mm and 20 cm, pre-impregnated with a thermoplastic or a thermosetting plastic material, and reinforced with reinforcement fibres, are laid down, preferably by means of a robotically guided pressure application roller, along prescribed curved paths on a shaping base (moulding tool). The laying process is preferably automatically repeated until the TFP workpiece that is being successively built up has achieved the desired design geometry and material thickness. The automated laying process enables the geometrical dimensions of the fibre composite components to be reliably reproduced with low manufacturing costs whilst at the same time being manufactured in large numbers. The laying down of the fibre strips, already pre-impregnated by the manufacturer (so-called pre-preg strips), preferably takes place along curved paths that ensure that the profiles of the reinforcement fibres in the finished component are aligned with the force fields. Using an inflexible pressure application roller, however, the fibre strips can only be laid down onto flat or slightly curved moulding tool surfaces and pressed down onto these. In contrast the laying down of a fibre strip onto moulding tool surfaces that are more highly curved in one or two dimensions requires the deployment of an elastic pressure application roller, which must retain its elasticity with a sufficient stability of shape even at higher temperatures.

Depending upon the plastic material deployed for the formation of the matrix further processing of the component takes place after the laying down process has been completed. For example, if the fibre strips are formed with a curable, thermosetting plastic material such as an epoxy resin, for example, curing of the workpiece is generally undertaken with the application of pressure and/or temperature so as to complete the composite component. Fibre strips impregnated with a thermoplastic plastic material already require high temperatures of up to 450° C. during the laying down process in order to maintain sufficient flexibility of the fibre strips. In the case of thermoplastic fibre strips no further processing steps need to be undertaken once the TFP process is completed; instead an active or passive cooling of the workpiece down to room temperature is sufficient.

WO 98/42991 discloses a pressure application roller for textile machinery, which is provided with an elastic coating. The elasticity of the pressure application roller that is required in the TFP process is brought about only by the coating, so that the pressure application roller is unsuitable, in particular for moulding tools that are more highly curved locally.

Moreover from EP 0 441 114 A1 an arrangement of two elastic rollers, which are provided with a coating in the μm-range, is of known art. Such rollers are deployed, for example, in photocopier equipment in the toner fixing unit. By virtue of the small material thickness of the coating these rollers are also unsuitable for the laying down and application of pressure onto fibre strips on more highly curved moulding tool surfaces.

EP 0 625 735 A1 concerns an elastic fixing roller with an elastic roller body and an anti-friction sleeve. The roller body is formed with a rubber foam plastic, while the sleeve is built up with PTFE and silicon rubber. The elasticity of this fixing roller is insufficient to compensate for larger changes in the height profile of a moulding tool used for the TFP process.

The object of the invention is therefore to create a pressure application roller unit, which can preferably be guided in an automated manner, for purposes of laying down fibre strips in the TFP process, which can also be deployed on moulding tools with more severe local curvature, and which moreover can withstand temperatures of up to 450° C. Furthermore it is an object of the invention to provide a laying down device for the automated laying down of fibre strips by means of such a pressure application unit.

The inventive object is achieved in the first instance by a pressure application unit with the features of claim 1.

By virtue of the fact that the pressure application roller is subdivided into a multiplicity of roller segments arranged side-by-side, each of which is mounted in the mounting unit such that it can be displaced, the pressure application roller can preferably be guided in a simple and automated manner by means of manipulative equipment, in particular a robot arm, a portal robot, or an articulated arm robot, even on a moulding tool surface having small radii of curvature in some regions. The fibre strips to be laid down by means of the pressure application roller unit in the course of the TFP process, can optionally have a thermoplastic or a thermosetting plastic matrix. Carbon fibres, Aramide® fibres, Kevlar® fibres, glass fibres, or natural fibres, for example, can be deployed as the reinforcing fibres.

In an advantageous further development of the pressure application roller unit the roller segments are mounted such that they can be displaced orthogonally with respect to a feed movement.

By this means even more highly curved regions of the moulding tool surface can be traversed by the pressure application roller, by virtue of the latter's ability to compensate for height, without any significant increase in the resistance force. Any immediate track correction of the robot arm guiding the pressure application unit, for example, as a result of the lift of the pressure application rollers with the occurrence of a rise in the moulding tool surface, can generally be dispensed with.

In accordance with a further development of the pressure application roller each of the roller segments has a longitudinal groove running in the displacement direction for purposes of accommodating the shaft.

By this means the freedom of movement of the individual roller segments in the vertical direction is ensured.

In a further advantageous configuration provision is made that the shaft has two sliding surfaces running in the displacement direction, facing away from one another, for purposes of guiding the roller segments.

By this means a smooth vertical guidance of the longitudinal grooves of the individual roller segments is provided on the shaft, which has a rectangular cross-sectional geometry.

In a further development of the pressure application roller unit provision is made that the roller segments are spring-mounted in the displacement direction.

As a consequence of the spring mounting of the roller segments, a pressure application force is provided that is defined for each point in time. Any lift-off of the individual roller segments from the moulding tool surface, i.e. from the fibre strip that is being laid down, is prevented by this means under almost all operating conditions.

In a further development of the pressure application roller unit provision is made that the roller segments are individually spring-mounted, in each case via an initial pressure application unit.

As a consequence of the indirect application of load onto the roller segments with the desired spring force by means of the initial pressure application units in each case rolling on the roller segments, a simpler design of roller segment ensues. At the same time the risk of adhesion of plastic residues from the fibre strips on the springs is reduced; this could prevent the roller segments from retracting in a sprung manner.

In accordance with a further configuration of the pressure application roller unit the initial pressure application units in each case have a wheel that is pre-loaded by a spring; the wheel rolls on an outer periphery of the roller segments.

This ensures smooth rolling of the roller segments on the moulding tool surface, together with the provision of optional sprung vertical height compensation for the individual roller segments, so that an optimal laying down and pressure application result can be achieved, even in the case of moulding tool surfaces that are locally more highly curved in one and/or two dimensions.

In a further advantageous configuration of the pressure application unit provision is made that the mounting unit has a U-shaped profile with two arms, between which the roller segments are mounted such that they can rotate, and has a cross-beam.

The cross-beam connects the upper ends of the arms and allows the pressure application roller unit to be mechanically connected to various items of automated manipulation equipment, in particular a robot arm, an articulated arm robot, a portal robot, or similar.

In accordance with a further development the roller segments are provided in each case with an elastic sleeve, at least in some sections.

This enables the compensation for slight vertical fluctuations in height in the surface geometry of the moulding tool, which lie in the range of up to some 100 μm. A sufficiently temperature resistant silicon elastomer can, for example, be deployed as the sleeve. At the same time the risk of adhesion of plastic material from the fibre strip is reduced by this means.

In addition the task is achieved by means of a laying down device for purposes of laying down fibre strips on a surface by means of a robot arm for purposes of guiding at least one inventive pressure application roller unit in the feed direction.

The laying down device embodied in such a manner allows the automated laying down of fibre strips in a reliably reproducible manner, even on moulding tool surfaces that are locally more highly curved, for purposes of creating integral fibre composite components with a complex surface geometry with at the same time low manufacturing costs.

In the drawing:

FIG. 1 shows a perspective view of the inventive pressure application unit.

Figure 2:
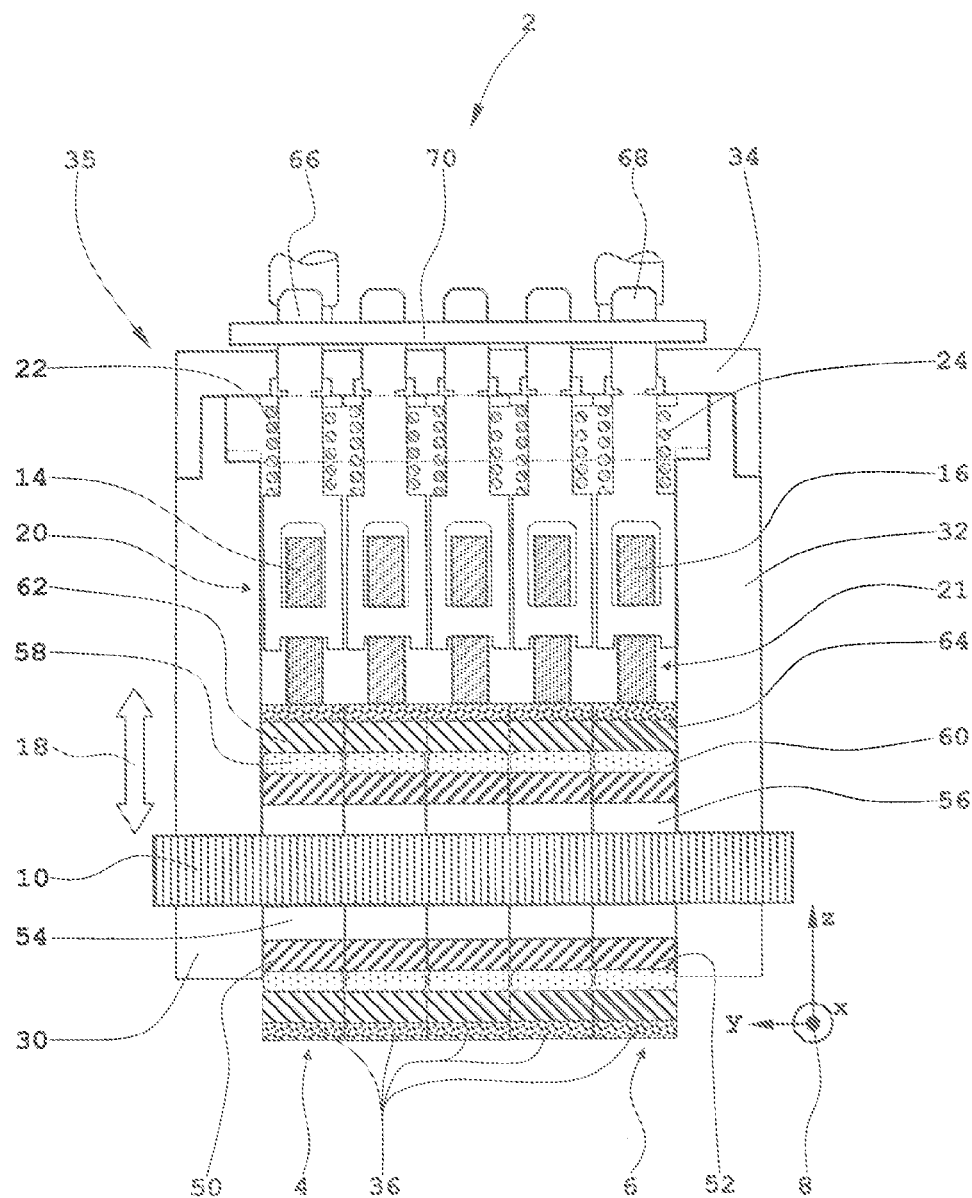
Figure 3:
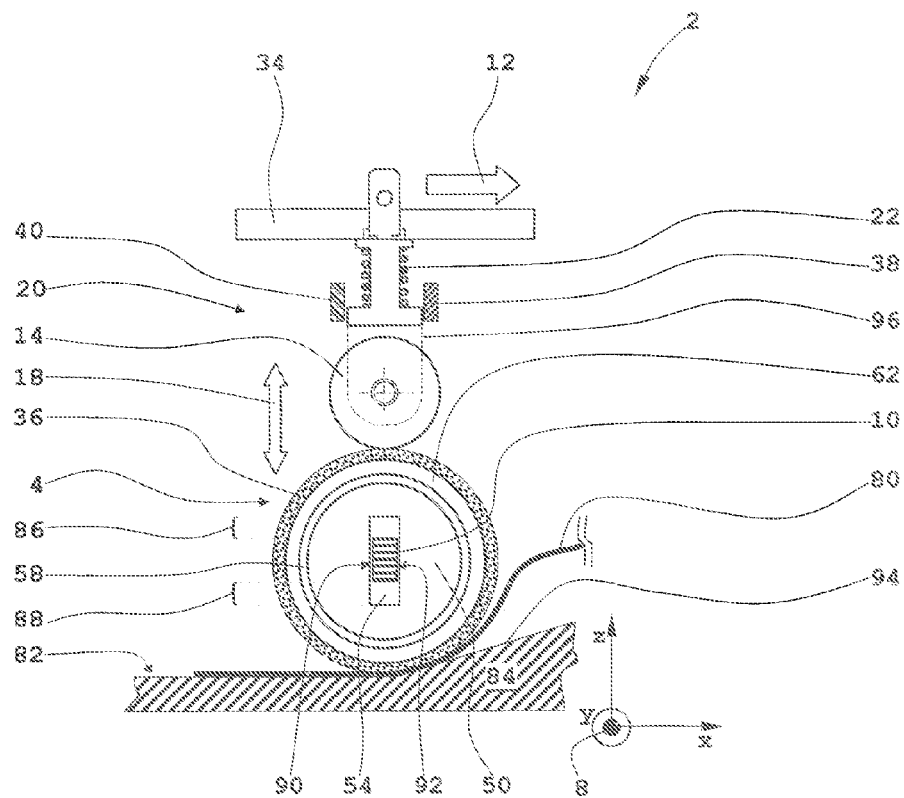
Figure 4:
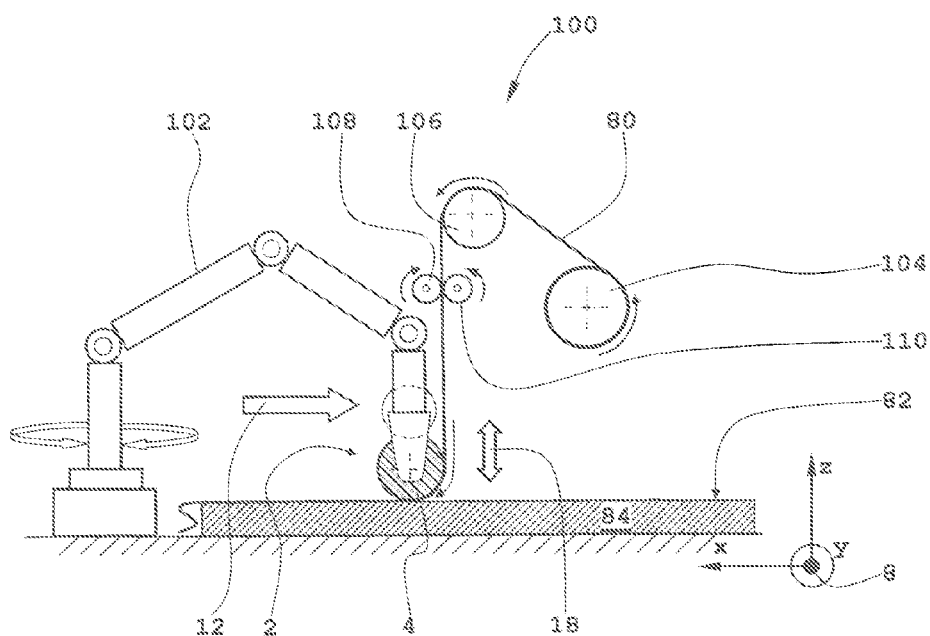

FIG. 2 shows a cross-sectional representation through the pressure application unit along the line II-II in FIG. 1, FIG. 3 shows a schematic representation of the mode of operation of the pressure application unit in terms of a roller segment with wheel, and FIG. 4 represents the principles of the laying down device with a pressure application unit configured in accordance with the invention and guided on a robot arm.

In the figures the same design elements have the same reference numbers.

FIG. 1 illustrates a perspective view of the inventive pressure application unit.

A pressure application roller unit 2 for purposes of laying down fibre strips onto a curved surface of a moulding tool comprises amongst other items a multiplicity of roller segments, of which in the interests of a better overview of the drawing only the roller segments 4, 6 are provided with reference numbers. The five roller segments shown in FIG. 1 form in their totality a cylindrical pressure application roller 7 with a width of between 10 mm and 20 cm. A coordinates system 8 serves to illustrate the spatial location of the components. The roller segments 4, 6 are accommodated on a shaft 10 with an approximately rectangular cross-sectional geometry such that each can rotate individually. During the laying down process of a fibre strip, not represented, the pressure application roller unit 2 moves in a feed direction 12, that is to say, parallel to the direction of the x-axis of the coordinates system 8. Thus the displacement direction 18 runs orthogonally to the feed movement 12. In accordance with the invention wheels are arranged above the roller segments; of these the two outer wheels bear the reference numbers 14, 16. All wheels are accommodated in a sprung manner in the pressure application roller unit 2, in each case parallel to the z-axis of the coordinates system 8, that is to say, in the displacement direction 18, in order to compensate for local differences in height in a surface of a moulding tool, not represented in FIG. 1, which serves as the laying down surface for the fibre strips that are to be laid down in the TFP process. The wheels 14, 16 are part of the initial pressure application unit 20, 21. The same is true for all other wheels that are not provided with reference numbers; these are similarly components of other initial pressure application units. For each wheel of each initial pressure application unit a compression spring is present in each case, of which the two outer compression springs bear the reference numbers 22, 24 in a representative manner for all the others. During the laying down process the wheels 14, 16 of the initial pressure application units roll over the respective peripheral surfaces of the roller segments. For example, during the laying down process the wheels 14, 16 roll on the peripheral surfaces 26, 28 of the roller segments 4, 6 and at the same time can retract in a sprung manner in the displacement direction 18 by an increment of, for example, up to 10 mm, and by this means can compensate for differences in height as a result of more severe local alterations in curvature of a moulding tool surface. By means of the compression springs 22, 24 the roller segments 4, 6 are at the same time pressed against the laid-down fibre strip, i.e. the moulding tool surface, with a defined pressure application force, and any lift-off of the roller segments 4, 6 is prevented The pressure application roller unit 2 comprises furthermore two arms 30, 32 arranged in a U-shape, i.e. in the shape of a fork; the upper ends of these arms are connected with one another via a cross-beam 34, and in their totality represent a mounting unit 35. By means of the mounting unit 35 the pressure application roller unit 2 is connected with a robot arm, not represented in FIG. 1, in order to enable the automated guidance of the pressure application roller unit 2 over the moulding tool surface during the process of laying the fibre strips. The connection preferably takes place by means of a standardised mechanical interface, which allows a rapid changeover and mounting of the pressure application roller unit 2 on a multiplicity of standardised items of manipulation equipment. The peripheral surfaces of the roller segments 4, 6 can be coated, at least in some regions, with an elastic coating, or sleeve 36, for example with a high-temperature resistant silicon elastomer, in order to compensate for slight changes in height in the displacement direction 18, i.e. the z-axis of the coordinates system 8, and moreover to prevent any adhesion of plastic residues from the matrix of the fibre strip.

A comb 38, 40 is arranged in each case underneath the cross-beam 34 in the region of the front or rear face, not designated, of the pressure application roller unit 2. The combs 38, 40 run parallel to the cross-beam 34 that is located above them. Each of the combs 38, 40 has a multiplicity of rectangular fingers, directed downwards in each case, not provided with a reference number; in each case these protrude into an empty space between two adjacent wheels. Between the fingers of the combs 38, 40 a rectangular recess, not designated, is located in each case. In the example of embodiment shown the pressure application roller unit 2 is fitted with five roller segments 4, 6 on which roll five wheels 14, 16 of the initial pressure application units 20, 21, each sprung-mounted with a compression spring, such that the combs 38, 40 in this case have four rectangular fingers.

FIG. 2 shows the pressure application roller unit 2 from FIG. 1 in a schematic sectional representation along the line of cut II-II. The coordinates system 8 illustrates once again the location of all components in space.

The shaft 10 is accommodated in a stationary manner between the arms 30, 32. The roller segments 4, 6 are mounted such that they can be displaced in the displacement direction 18, that is to say, parallel to the z-axis, and in turn can rotate on the shaft 10. In order to achieve this dual functionality of mechanical movement, each roller segments 4, 6 has an inner hub 50, 52 in the approximate form of a disc, in each case with a longitudinal groove 54, 56. The longitudinal groove 54, 56 runs parallel to the z-axis. In the example of embodiment shown each of the inner hubs 50, 52 is accommodated such that it can rotate via a sealed radial bearing 58, 60 in a similarly disc-shaped outer hub 62, 64 of the roller segments 4, 6, and thus can rotate freely about the shaft 10, while the inner hubs 50, 52 of the roller segments 4, 6 can retract and extend in a sprung manner in the displacement direction 18 on the rectangular shaft 10 by virtue of the longitudinal grooves 54, 56 by a length of up to 10 mm, but cannot rotate.

Here each of the wheels 14, 16 of the pressure application roller units 20, 21 arranged underneath the cross-beam 34 rolls on the roller segments 4, 6; by means of the compression springs 22, 24 these press the roller segments 4, 6 with a predefined pressure application force in a direction opposed to the z-direction of the coordinates system 8. By this means all roller segments apply an exactly adjustable pressure application force onto the laid down fibre strips, i.e. onto the moulding tool surface that is located underneath them.

The statements made above apply correspondingly for the further three roller segments located between the roller segments 4, 6, and for the further three wheels located between the wheels 14, 16 of the initial pressure application units 20, 21. The compression springs 22, 24 are accommodated on shafts 66, 68 with a preferably circular cross-section; these are guided in the cross-beam 34 connecting the two arms 30, 32. The arms 30, 32 together with the cross-beam 34 form a U-shaped i.e. a fork-shaped, mounting unit 35 for the roller segments and the wheels.

Accordingly each of the roller segments, mounted on the shaft 10 such that they can rotate, can retract in a sprung manner independently of one another in the direction of the z-axis of the coordinates system 8 by, for example, up to 10 mm from the position shown in FIG. 2 in the direction of the cross-beam 34, and at the same time can rotate. As a consequence of this configuration an optimal adaptability of the pressure application roller unit 2 to a moulding tool surface that is more highly curved in at least one spatial direction in some regions is provided, wherein at the same time an exactly defined pressure application force acts on the laid down fibre strip.

The vertical location of the vertical shafts 66, 68 is secured by means of a transverse pin 70 that is guided parallel to the y-axis through transverse holes in the vertical shafts, not designated. In the upward direction the compression springs 22, 24 are supported on disks, which are not designated in any further detail; in turn these are guided on the shafts 66, 68, and in the upward direction are restrained by the cross-beam 34. In the representation of FIG. 2 the orientation of the x-axis corresponds to the feed movement 12 of the pressure application roller unit 2. Alternatively the wheels of the feed units can also be provided, at least in some regions, with a coating of the same type as the sleeves 36 of the roller segments FIG. 3 illustrates in a schematic representation the functionality of the pressure application roller unit with the aid of an isolated roller segment with a related initial pressure application unit, with wheel, during the laying down of a fibre strip. The coordinates system 8 once again illustrates the location of the components in space.

The roller segment 4 of the pressure application roller unit 2 rolls with its sleeve 36 on a fibre strip 80 in the direction of the feed movement 12 (parallel to the x-axis) and thus lays the fibre strip 80 down on a surface 82 of a moulding tool 84 that is curved in at least one dimension. At the same time the wheel 14 of the initial pressure application unit 20 rolls in the opposite direction on the roller segment 4 in a sprung manner, such that height compensation is possible in the displacement direction 18 (parallel to the z-axis). By the appropriate selection of spring rate for the compression spring 22 the pressure application force with which the wheel 12 presses onto the roller segment 4 and thus onto the fibre strip 80, i.e. onto the surface 82 of the moulding tool 84, can be precisely adapted over a wide range to the processing parameters of the fibre strip 80. In the central (vertical) position shown in FIG. 3 the wheel 14 can move in a sprung manner by the height increments 86, 88 in the direction of the z-axis, or in the opposite direction, respectively. This possibility of vertical height compensation is enabled by virtue of the fact that a longitudinal groove 54 is let into the inner hub 50 of the roller segment 4; this can be displaced vertically in an appropriate manner on the shaft 10. Between the inner hub 50 and the outer hub 62 of the roller segment 4 is located the radial bearing 58, preferably fully sealed, in order to ensure simultaneously the free rotation of the roller segment 4 about the shaft 10. Sealing of the radial bearing 58 is in general necessary to prevent any contamination with the plastic material used in the impregnation of the fibre strip 80. Furthermore it can be necessary to provide wipers, not represented, to remove any plastic material adhering to the sleeve 36. To ensure guidance of the roller segment 4 on the shaft 10 that is as precise as possible and, in the ideal case, free of any play and clearance, the shaft has two sliding surfaces 90, 92 arranged facing away from one another that can be fitted with an anti-friction coating, at least in some regions. Alternatively or additionally longitudinal surfaces of the longitudinal grooves 54, 56 can also be fitted with an anti-friction coating. The arms of the mounting unit, connected with one another via the cross-beam 34 (cf. FIGS. 1, 2), are not represented in the representation in FIG. 3 in the interests of greater clarity of the drawing. However, from the representation in FIG. 3 it can be discerned that the combs 38, 40 run at right angles to the plane of the drawing, that is to say, parallel to the y-axis of the coordinates system 8.

As a consequence of this design it is, for example, possible to guide the pressure application roller unit 2 with hardly any resistance over even a more severe rise 94 (curvature) of the surface 82 of the moulding tool 84, for example, without the need for the vertical spatial position of a robot arm, not represented here, for the automated guidance of the pressure application roller unit 2 in its vertical position, to be immediately corrected upwards to prevent too high a mechanical loading; as a result the complexity of the control and/or regulation necessary for the position control of the robot arm is reduced. The mounting of the wheel 14 in the initial pressure application unit 20 is undertaken by means of a mounting fork 96, indicated by a dashed line, with the use of a radial bearing. The design configuration of all other initial pressure application units corresponds to this configuration.

FIG. 4 shows an automated laying down device for the execution of the TFP method with the deployment of the inventive pressure application roller unit.

The coordinates system 8 serves to illustrate the components in space. An inventively embodied laying down device 100 comprises, amongst other items, a pressure application roller unit 2, which is attached to the end of a robot arm 102. Instead of the robot arm 102 any kind of articulated arm or portal robot can find application for purposes of guiding the pressure application roller unit 2. The robot arm 102 allows free positioning of the pressure application roller unit 2 in space relative to the surface of the moulding tool 84. By means of the pressure application roller unit 2 attached to the robot arm 102 the fibre strip 80 is laid down on the surface 82 and is pressed down with a defined pressure application force, which acts in a direction opposed to the z-axis of the coordinates system 8. The fibre strip 80 is held on a supply roller 104, guided via a deflecting roller 106, and then transported onward by means of two counter-rotating drums 108, 110 and supplied to the pressure application roller unit 2. During the laying down process the pressure application roller unit 2, guided by the robot arm 102, moves for example in the movement direction 12, that is to say, parallel to the x-axis. However, it is also possible to position the supply roller 104, the feed system 106, 108, 110 and the pressure application roller unit 2 so that they are fixed in space, and to move the moulding tool 84 instead. Here the individual roller segments can move individually in a sprung manner by an absolute increment of up to 10 mm vertically in the displacement direction 18. By this means the fibre strip 80 can be laid down with hardly any resistance, and at the same time free of distortions or creases, even on surfaces 82 of the moulding tool 84 that are more highly curved in some regions.

The fibre strip 80, i.e. the so-called pre-preg strip material, is preferably reinforced with carbon fibres, which are embedded into a plastic matrix of optionally a thermoplastic or a thermosetting plastic material. Alternatively any organic and/or inorganic reinforcement fibres can also be deployed, as long as a prescribed mechanical load capacity of the composite component produced in the TFP process is provided. In the case of a thermoplastic resin matrix it can—depending upon the specific material properties of the thermoplastic plastic—be necessary to heat the fibre strip 80 to a temperature of up to 450° C., for example, by means of a laser beam, in order to ensure its flexibility and manipulability during the TFP process. Accordingly the pressure application roller unit 2, inclusive of all rollers and drums deployed in the guidance or deflection of the fibre strip 80, must have a sufficient resistance to temperature.

REFERENCE SYMBOL LIST

| | |
|---|---|
| 2. | Pressure application unit |
| 4. | Roller segment |
| 6. | Roller segment |
| 7. | Pressure application roller |
| 8. | Coordinates system |
| 10. | Shaft (rectangular cross-section geometry) |
| 12. | Feed movement |
| 14. | Wheel |
| 16. | Wheel |
| 18. | Displacement direction (height compensation) |
| 20. | Initial pressure application unit |
| 21. | Initial pressure application unit |
| 22. | Compression spring |
| 24. | Compression spring |
| 26. | Peripheral surface (roller segment) |
| 28. | Peripheral surface (roller segment) |
| 30. | Arm |
| 32. | Arm |
| 34. | Cross-beam |
| 35. | Mounting unit |
| 36. | Sleeve (coating) |
| 38. | Comb |
| 40. | Comb |
| 50. | Inner hub |
| 52. | Inner hub |
| 54. | Longitudinal groove |
| 56. | Longitudinal groove |
| 58. | Radial bearing |
| 60. | Radial bearing |
| 62. | Outer hub |
| 64. | Outer hub |

(50–64: Roller segments)

| | |
|---|---|
| 66. | Vertical axis (compression spring/wheel) |
| 68. | Vertical axis (compression spring/wheel) |
| 70. | Transverse pin |
| 80. | Fibre strip |
| 82. | Surface |
| 84. | Moulding tool |
| 86. | Height increment |
| 88. | Height increment |
| 90. | Sliding surface |
| 92. | Sliding surface |

(90, 92: Shaft)

| | |
|---|---|
| 94. | Rise |
| 100. | Laying down device |
| 102. | Robot arm |
| 104. | Supply roller |
| 106. | Deflecting roller |
| 108. | Drum |
| 110. | Drum |

The invention claimed is:

1. A pressure application roller unit for the laying down of fibre strips on a surface, with a pressure application roller mounted in a mounting unit such that the pressure application roller can rotate about a shaft, wherein, the pressure application roller is subdivided into a multiplicity of roller segments arranged next to one another, which in each case are mounted in the mounting unit such that they can be displaced, wherein the pressure application roller unit comprises initial pressure application units, the initial application units in each case having a wheel that is pre-loaded by a spring, which wheel rolls on a peripheral surface of the roller segments and wherein the roller segments as well as the wheel are provided in each case with an elastic sleeve, at least in some sections.

2. The pressure application roller unit in accordance with claim 1, wherein the roller segments are mounted such that they can be displaced orthogonally with respect to a feed movement.

3. The pressure application roller unit in accordance with claim 2, wherein the roller segments in each case have a longitudinal groove running in a displacement direction for purposes of accommodating the shaft.

4. The pressure application roller unit in accordance with claim 3, wherein the shaft has two sliding surfaces running in the displacement direction, facing away from one another, for purposes of guiding the roller segments.

5. The pressure application unit in accordance with claim 1, wherein the roller segments are spring-mounted in the displacement direction.

6. The pressure application roller unit in accordance with claim 5, wherein the roller segments are individually spring-mounted, in each case via an initial pressure application unit.

7. The pressure application roller unit in accordance with claim 6, wherein the mounting unit has a U-shaped profile with two arms, between which the roller segments are mounted, and has a cross-beam, on which the initial pressure application units are supported.

8. A laying down unit for the laying down of fibre strips on a surface by means of a robot arm for purposes of guiding at least one pressure application roller unit in accordance with claim 1, in the feed movement.

* * * * *